(12) United States Patent
Kang et al.

(10) Patent No.: US 9,448,905 B2
(45) Date of Patent: Sep. 20, 2016

(54) MONITORING AND CONTROL OF STORAGE DEVICE BASED ON HOST-SPECIFIED QUALITY CONDITION

(71) Applicants: Jeong Uk Kang, Bucheon-Si (KR); Jee Seok Hyun, Hwaseong-Si (KR); Eun Jin Yun, Seoul (KR)

(72) Inventors: Jeong Uk Kang, Bucheon-Si (KR); Jee Seok Hyun, Hwaseong-Si (KR); Eun Jin Yun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/262,897

(22) Filed: Apr. 28, 2014

(65) Prior Publication Data

US 2014/0325095 A1    Oct. 30, 2014

(30) Foreign Application Priority Data

Apr. 29, 2013    (KR) ........................ 10-2013-0047771

(51) Int. Cl.
     *G06F 11/30*      (2006.01)
     *G06F 11/34*      (2006.01)

(52) U.S. Cl.
     CPC ....... *G06F 11/3034* (2013.01); *G06F 11/3419* (2013.01); *G06F 11/3485* (2013.01)

(58) Field of Classification Search
     CPC ........... G06F 11/3034; G06F 11/3485; G06F 11/3419
     See application file for complete search history.

(56) References Cited

U.S. PATENT DOCUMENTS

| | | | |
|---|---|---|---|
| 7,107,403 B2 * | 9/2006 | Modha et al. ................ | 711/129 |
| 7,529,778 B1 | 5/2009 | Dewey et al. | |
| 7,987,258 B2 * | 7/2011 | Sugauchi ............ | H04L 12/2602 |
| | | | 709/223 |
| 8,292,177 B2 | 10/2012 | Elhamias et al. | |
| 8,307,170 B2 | 11/2012 | Fujino | |
| 8,392,558 B1 * | 3/2013 | Ahuja ...................... | G06F 9/505 |
| | | | 709/223 |
| 8,843,712 B1 * | 9/2014 | Smith ........................... | 711/159 |
| 9,104,482 B2 * | 8/2015 | Merchant .............. | G06F 9/5011 |
| 2003/0055920 A1 * | 3/2003 | Kakadia .............. | H04L 41/5022 |
| | | | 709/220 |
| 2004/0181594 A1 * | 9/2004 | Suleiman ....................... | 709/225 |
| 2006/0117223 A1 * | 6/2006 | Avritzer et al. ................. | 714/38 |
| 2009/0129277 A1 * | 5/2009 | Supalov et al. .............. | 370/241 |
| 2009/0150894 A1 | 6/2009 | Huang et al. | |
| 2009/0228535 A1 | 9/2009 | Rathi et al. | |
| 2009/0259799 A1 * | 10/2009 | Wong ................... | G06F 12/0207 |
| | | | 711/103 |
| 2010/0106816 A1 * | 4/2010 | Gulati et al. .................. | 709/223 |
| 2010/0122016 A1 * | 5/2010 | Marotta ................ | G11C 16/16 |
| | | | 711/103 |
| 2011/0066768 A1 | 3/2011 | Brittner et al. | |
| 2011/0145449 A1 | 6/2011 | Merchant et al. | |
| 2011/0258354 A1 * | 10/2011 | Wang .................. | G06F 13/1626 |
| | | | 710/114 |
| 2011/0276817 A1 * | 11/2011 | Fullerton et al. ............. | 713/324 |
| 2012/0017020 A1 | 1/2012 | Pruthi et al. | |
| 2012/0159090 A1 | 6/2012 | Andrews et al. | |
| 2012/0311138 A1 * | 12/2012 | Inamdar .............. | G06F 11/3404 |
| | | | 709/224 |
| 2014/0223072 A1 * | 8/2014 | Shivashankaraiah et al. ............................ | 711/103 |

\* cited by examiner

*Primary Examiner* — Eric Oberly
(74) *Attorney, Agent, or Firm* — Volentine & Whitt, PLLC

(57) ABSTRACT

A method of controlling a storage device comprises monitoring whether a quality of service (QoS) of the storage device satisfies a quality condition set through a host, and adjusting a current setting of at least one operation metric of the storage device related to the QoS, according to a result of the monitoring.

20 Claims, 15 Drawing Sheets

MONITORING AND CONTROL OF STORAGE DEVICE BASED ON HOST-SPECIFIED QUALITY CONDITION

CROSS-REFERENCE TO RELATED APPLICATIONS

This application claims priority under 35 U.S.C. §119 to Korean Patent Application No. 10-2013-0047771 filed on Apr. 29, 2013, the subject matter of which is hereby incorporated by reference.

BACKGROUND OF THE INVENTION

Embodiments of the inventive concept relate generally to information storage technologies. More particularly, certain embodiments of the inventive concept relate to systems, methods, and apparatuses in which a storage device is monitored and controlled based on a host-specified quality condition.

A memory system typically comprises a storage device connected to a host. The storage device may store and access data in response to commands from the host. For example, the storage device may write data in response to a write command from the host, read data in response to a read command from the host, and erase data in response to an erase command from the host.

In general, the performance of the storage device may evaluated according to its response time and throughput, where response time indicates the amount of delay to complete an operation, and throughput indicates a number of operations performed per unit time. Response time and throughput are typically in a tradeoff relationship, with better response time (i.e., less delay) coming at the cost of worse throughput, and vice versa. Response time and throughput may also vary over time, e.g., with unusually slow response time and/or low throughput occurring on occasion.

In some circumstances, the host may require a predetermined level of performance from the storage device. For example, when executing real-time operations, the host may require that the response time be less than a maximum level, or when performing certain batch operations, the host may require a minimum level of throughput. Moreover, the host may also require a certain level of uniformity of performance. For example, it may require that variations of response time or throughput remain within predetermined bounds.

In general, the performance demands on a storage device, as well as factors affecting the performance, may change over time. For instance, in a storage device comprising flash memory, repetition of memory access operations tends to decrease reliability of memory cells over time, and it also tends to reduce the amount of available storage space due to invalid blocks. These and other changes can make it more difficult to meet response time and throughput requirements. Accordingly, there is a general need for memory systems to adapt to changes in their operating conditions.

SUMMARY OF THE INVENTION

In one embodiment of the inventive concept, a method of controlling a storage device comprises monitoring whether a quality of service (QoS) of the storage device satisfies a quality condition set through a host, and adjusting a current setting of at least one operation metric of the storage device related to the QoS, according to a result of the monitoring.

In another embodiment of the inventive concept, a host device comprises a service level agreement (SLA) management module configured to receive a user input indicating a setting of a quality condition of QoS of a storage device, and a control module configured to control monitoring of the QoS of the storage device to determine whether the storage device satisfies the quality condition, and further configured to control selective adjustment of at least one operation metric of the storage device according to whether the QoS of the storage device satisfies the quality condition.

In yet another embodiment of the inventive concept, a storage device comprises at least one memory device configured to perform memory access operations in accordance with at least one operation metric of the storage device having an adjustable setting, and an operation metric management module configured to adjust a current setting of the at least one operation metric according to whether a QoS of the storage device satisfies a quality condition set through a host.

In yet another embodiment of the inventive concept, a system comprises a storage device configured to perform memory access operations in accordance with at least one operation metric having an adjustable setting, a host configured to receive a user input and to set a quality condition for QoS of the storage device according to the user input, an operation metric monitoring module configured to monitor whether the QoS of the storage device satisfies the quality condition set by the host and to generate a value for a current setting according to the monitoring, and an operation metric management module located in the storage device and configured to adjust the current setting of the at least one operation metric to the value determined by the operation metric monitoring module.

These and other embodiments of the inventive concept can potentially improve performance and flexibility of memory systems by allowing a storage device to be monitored and controlled according to a host-specified quality condition.

BRIEF DESCRIPTION OF THE DRAWINGS

The drawings illustrate selected embodiments of the inventive concept. In the drawings, like reference numbers indicate like features.

DETAILED DESCRIPTION

Selected embodiments of the inventive concept are described below with reference to the accompanying drawings. These embodiments are presented as teaching examples and should not be construed to limit the scope of the inventive concept.

The described embodiments relate generally to the monitoring and control of a storage device based on a host-specified quality condition. For example, in certain embodiments, a QoS monitoring module monitors whether a QoS of a storage device satisfies a quality condition set through a host, and an operation metric management module adjusts a current setting of at least one operation metric of the storage device related to the QoS, according to a result of the monitoring.

In the description that follows, the term "module" refers generally to any set of components for implementing a designated functionality. For instance, a QoS monitoring module may comprise hardware and/or software for monitoring QoS. Such components may be organized in any fashion, so long as they implement the designated functionality. For instance, they may be distributed across different portions of a system, or they may be formed as a localized unit. The term "QoS" refers generally to any measurable aspect of a component's service based performance. For example, QoS of a storage device may refer to the storage device's response time, throughput, or storage capacity, which may be of service to a host. It may also refer to a state or index corresponding to several performance factors in combination. The QoS may be said to satisfy a "quality condition", for instance, if it is within designated bounds, has a designated level, contains an acceptable combination of values, etc. The term "operation metric" refers generally to any measurable factor related to the operation of a designated component. For instance, an operation metric of a storage device may be its throughput, a measure of its storage capacity, a measure of its data persistence, a measure of its data reliability, a measure of its latency, a measure of its uniformity of response time, or a measure of its power consumption. An operation metric of a component is generally related to QoS of the component if changing the operation metric changes the QoS.

Figure 1:
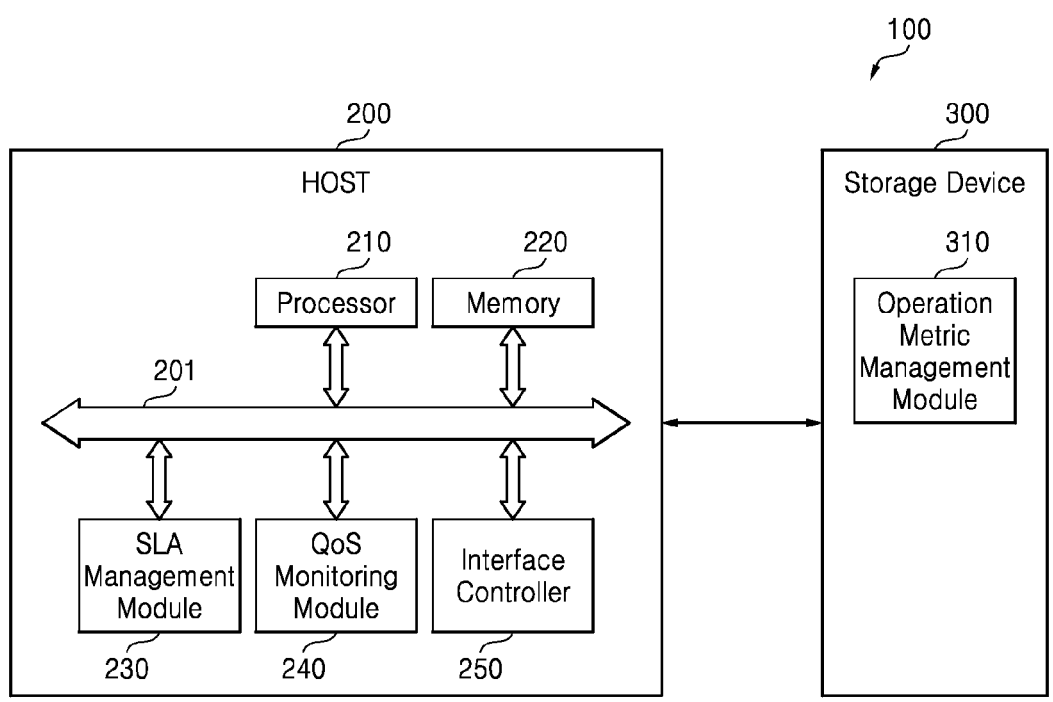
FIG. 1 is a block diagram of a system according to an embodiment of the inventive concept.

FIG. 1 is a block diagram of a system 100 according to an embodiment of the inventive concept.

Referring to FIG. 1, system 100 comprises a host 200 and a storage device 300. System 100 may take various alternative forms, such as a personal computer (PC), a data server, a network-attached storage (NAS), or a portable electronic device, for example. Selected examples of the portable electronic device include a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, mobile internet device (MID), or an e-book.

Host 200 monitors QoS of storage device 300, and it generates a request for adjusting operation metrics related to the QoS. Host 200 comprises a processor 210, a memory 220, an SLA management module 230, a QoS monitoring module 240, and an interface controller 250.

Processor 210 controls other components in host 200 through a bus 201. In some embodiments, processor 210 may take the form of an application processor (AP) or a mobile AP.

Memory 220 typically functions as a working memory storing data or programs used by processor 210. Memory 220 may be embodied in a volatile memory or a non-volatile memory, for instance.

SLA management module 230 manages an SLA for storage device 300 based on a user input, a predetermined scheme, or an automated process. For example, SLA management module 230 may receive a user request that storage device 300 operate with a designated QoS or quality condition. Alternatively, SLA management module 230 may determine a QoS or quality condition of QoS based on context, programming, or some other mechanism. To allow a user to input the request, SLA management module 230 may include a user input interface. The SLA managed by SLA management module 230 may be provided to or accessed by other components to influence monitoring and/or control operations performed on storage device 300. For instance, QoS monitoring module 240 may access a stored quality condition and perform monitoring of QoS based on the quality condition.

QoS monitoring module 240 monitors the QoS of storage device 300. In certain embodiments, this monitoring comprises determining whether the QoS of storage device 300 satisfies a quality condition indicated by SLA management module 230. Each of SLA management module 230 and QoS monitoring module 240 may be functionally and logically distinct from each other, yet they are not required to be implemented in a non-overlapping fashion, e.g., on separate devices or in separate code.

Interface controller 250 facilitates communication between host 200 and storage device 300. Interface controller 250 may be, for instance, a controller for a serial advanced technology attachment (SATA) interface or protocol, a serial attached (SAS) SCSI interface or protocol, a peripheral component interconnect (PCI) interface or protocol, a PCI express (PCIe) interface or protocol, or a universal serial bus (USB) interface or protocol.

Storage device 300 typically comprises one or more memory devices, and it may further comprise a memory controller. In some embodiments, one or more of the memory devices may be a double data rate (DDR) synchronous dynamic random access memory (RAM) (DDR SDRAM), a low power DDR (LPDDR) SDRAM, or a flash memory device. In some embodiments, storage device 300 takes the form of an embedded multimedia card (eMMC), a universal flash storage (UFS), a solid state drive (SSD), or a Redundant Array of Independent Disks (RAID). In certain alternative embodiments, one or more of the memory devices may be a non-volatile memory device other than a flash memory device. For example, one or more of the memory devices may be an Electrically Erasable Programmable Read-Only Memory (EEPROM), a Magnetic RAM (MRAM), a Spin-Transfer Torque MRAM, a Conductive bridging RAM (CBRAM), a Ferroelectric RAM (FeRAM), a Phase change RAM (PRAM), a Resistive RAM (RRAM), a Nanotube RRAM, a Polymer RAM (PoRAM), a Nano Floating Gate Memory (NFGM), a holographic memory, a Molecular Electronics Memory Device, or an Insulator Resistance Change Memory.

Storage device 300 comprises an operation metric management module 310. Operation metric management module 310 controls the setting of various operation metrics that are related to the QoS of storage device 300. Such operation metrics may include, for instance, throughput, storage capacity, data persistence, data reliability, latency, uniformity of response time, or power consumption.

The current setting of each operation metric may be adjusted according to monitoring operations performed by QoS monitoring module 240. For instance, if monitoring module 240 determines that the QoS of storage device 300 does not satisfy a quality condition set in SLA management module 230, host 200 may communicate with storage device 300 to update the current setting of one or more of the operation metrics. In response to the communication, operation metric management module 310 may update the operation metrics until QoS monitoring module 240 determines that the QoS of storage device 300 does satisfy the quality condition set in SLA management module 230.

In some embodiments, the updating of operation metrics is performed according to an established priority order. For instance, under some circumstances, factors determining throughput may be adjusted before those determining with storage capacity, data persistence, reliability, and so on. Similarly, under some circumstances, factors determining power consumption may be adjusted before those affecting other aspects of performance. In general, the priority order can be established either automatically by host 200 or in response to a user input.

The quality condition may be updated through the host, and operation metric management module 310 may adjust an operation metric related to the adjusted quality condition. The following examples present different scenarios in which the quality condition is adjusted and a related operation metric is adjusted accordingly.

In one example, a quality condition in the form of requested throughput is adjusted, and operation metric management module 310 adjusts an operation metric in the form of a maximum number of requests to be processed at a given time to achieve the requested throughput. To do this, operation metric management module 310 may adjust a maximum number of memories which may be activated at the same time among multiple memories (not shown) included in storage device 300.

In another example, a quality condition in the form of requested storage capacity is adjusted, and operation metric management module 310 adjusts an operation metric in the form of a size of space used for data storage in storage device 300. Operation metric management module 310 may ensure a storage capacity of storage device 310 by decreasing an overprovision ratio, the overprovision ratio referring to a relative amount of memory withheld from general data storage.

In yet another example, a quality condition in the form of data persistency is adjusted, and operation metric management module 310 adjusts an operation metric in the form of a size of a cache (not shown). To do this, operation metric management module 310 may decrease the size of the cache (not shown) to improve data persistency or increase a write back frequency of the cache (not shown). Alternatively, operation metric management module 310 may increase the size of the cache (not shown) or decrease the write back frequency of the cache (not shown) so as to improve performance of system 100.

In yet another example, a quality condition in the form of data reliability is adjusted, and operation metric management module 310 adjusts conditions for selecting one of a single level cell (SLC) mode and a multi level cell (MLC) mode as an operation mode of a buffer memory (not shown). The MLC mode may be selected in place of the SLC mode, for instance, where high data reliability is not required in system 100 and existing storage space of the buffer memory (not shown) is insufficient. Under the same conditions, data stored in a region used in the SLC mode among regions of the buffer memory (not shown) may be moved to a region used in a MLC mode among the regions of the buffer memory (not shown). Here, operation metric management module 310 may adjust a size of a reference space determining whether the remaining storage space is sufficient. On the other hand, the SLC mode may be selected in place of the MLC mode where an application requiring high data reliability in system 100, e.g., a finance transaction related application, is executed. Under these circumstances, operation metric management module 310 may convert the buffer memory (not shown) used in the MLC mode to the SLC mode.

In yet another example, a quality condition in the form of latency is adjusted, and operation metric management module 310 adjusts an operation metric related to a condition for converting an operation mode from the MLC mode to the SLC mode, a condition for moving data stored in a region used in the SLC mode among regions of a buffer memory (not shown) to a region used in the MLC mode among the regions of the buffer memory (not shown), i.e., data migration condition, a condition for performing wear-leveling, and/or a condition for performing reclaiming. Where high latency is allowed, operation metric management module 310 may ease a condition for converting an operation mode from the MLC mode to the SLC mode. In this case, operation metric management module 310 may strengthen a data transmission condition, a condition for performing wear-leveling, or a condition for performing reclaiming.

Figure 2:
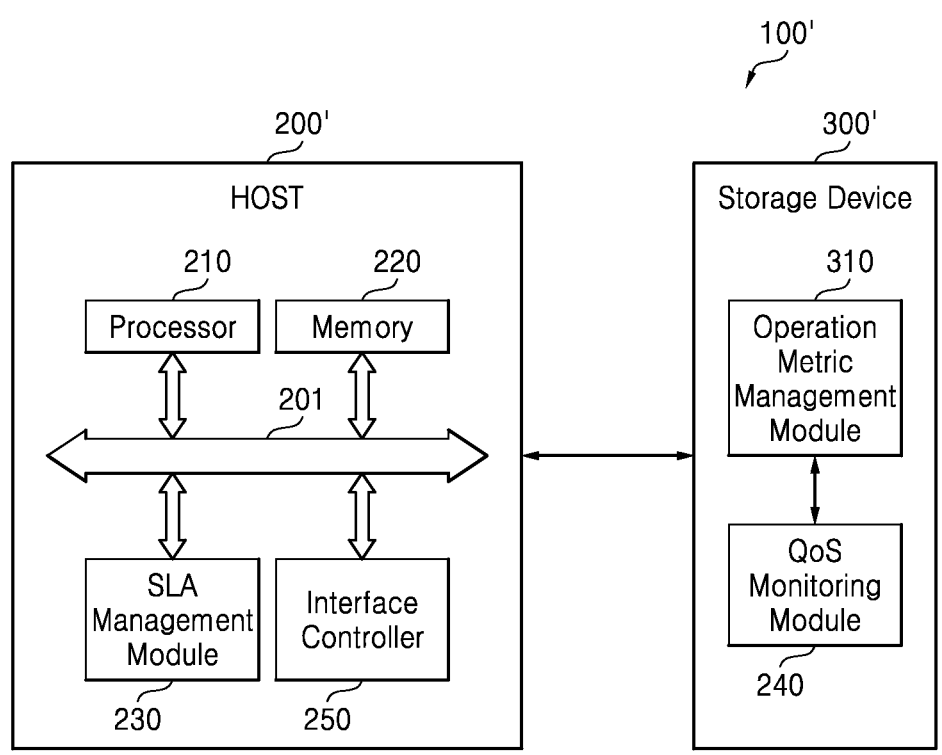
FIG. 2 is a block diagram of a system according to another embodiment of the inventive concept.

FIG. 2 is a block diagram of a system 100' according to another embodiment of the inventive concept. System 100' is a variation of system 100, with QoS monitoring module 240 relocated from host 200 to storage device 300.

Referring to FIG. 2, system 100' comprises a host 200' and a storage device 300', which have been modified relative to host 200 and storage device 300, respectively, as indicated above. Aside from this change, the illustrated components in FIG. 2 are substantially the same as those of system 100.

Figure 3:
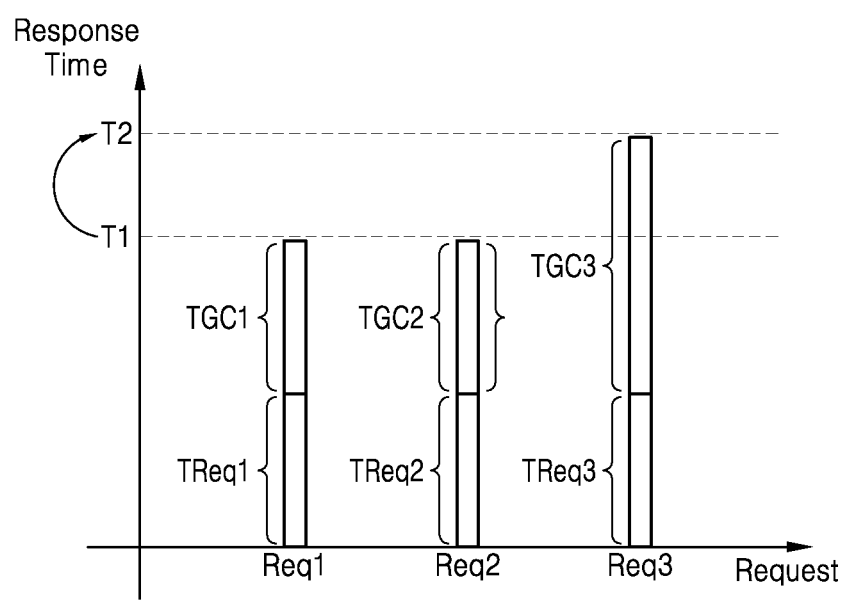
FIG. 3 is a response time diagram for successive operation requests in the system of FIG. 1 according to an embodiment of the inventive concept.

FIG. 3 is a response time diagram for successive operation requests in system 100 or 100' of FIG. 1 or FIG. 2 according to an embodiment of the inventive concept. It shows the response time of operations performed by storage device 300 or 300' in response to first through third operation requests Req1 through Req3.

Referring to FIG. 3, the performed operations include first through third requested operations, which are performed during corresponding timing intervals TReq1 through TReq3, and first through third garbage collection operations, which are performed during corresponding timing intervals TGC1 through TGC3.

It is assumed that a quality condition for QoS is related to uniformity of response time. It is further assumed that an operation metric of storage device 300 related to the quality condition is a maximum response time. As shown in FIG. 3, the maximum response time is initially set with a value T1. Storage device 300 adheres to this maximum response time in the operations performed in response to first and second operation requests Req1 and Req2, but not those performed in response to third operation request Req3. Accordingly, during the operations performed in response to third operation request Req3, QoS monitoring module 240 determines storage device 300 or 300' has not satisfied the quality condition related to uniform response time. In response to this determination, operation metric management module 310 adjusts the operation metric so the maximum response time becomes T2. With this adjustment, system 100 or 100' may be uniformly kept within the allowable response time T2.

Figure 4:
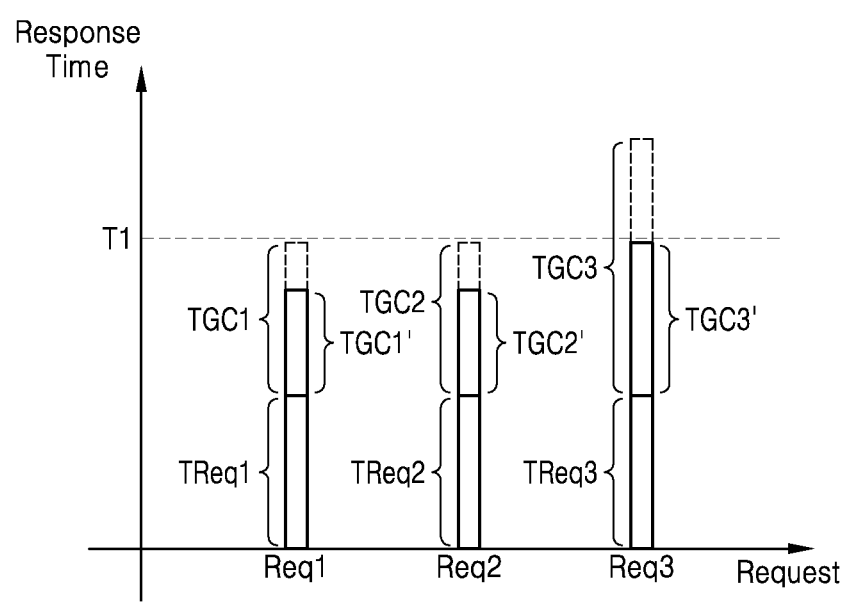
FIG. 4 is a response time diagram for successive operation requests in the system of FIG. 1 according to another embodiment of the inventive concept.

FIG. 4 is a response time diagram for successive operation requests in the system of FIG. 1 according to another embodiment of the inventive concept. The diagram of FIG. 4 is similar to the diagram of FIG. 3, except that the certain garbage collection operations are omitted, as indicated by dotted boxes. The omission of these garbage collection operations ensures that the response time T1 is never exceeded.

In the example of FIG. 4, QoS monitoring module 240 monitors whether the QoS satisfies a quality condition related to uniformity of response time. This quality condition may be an amount of available free space in storage device 300, which affects uniformity of response time because it determines when garbage collection operations are required. For example, where free space is abundant, fewer garbage collection operations are required, which tends to improve response time.

Where it is determined that the operations to be performed in response to one of first through third requests Req1 through Req3 will exceed response time T1, operation metric management module 310 may increase a free space threshold that determines when to perform garbage collection. An increase in this threshold may change intervals TGC1 through TGC3 to intervals TGC1' through TGC3', so that the response time for requests Req1 to Req3 does not exceed T1. Alternatively, where the monitoring of QoS indicates that the response time of storage device 300 satisfies the quality condition, storage device 300 or 300' may decrease the free space threshold for performing garbage collection, with results opposing those of increasing the free space threshold.

Figure 5:
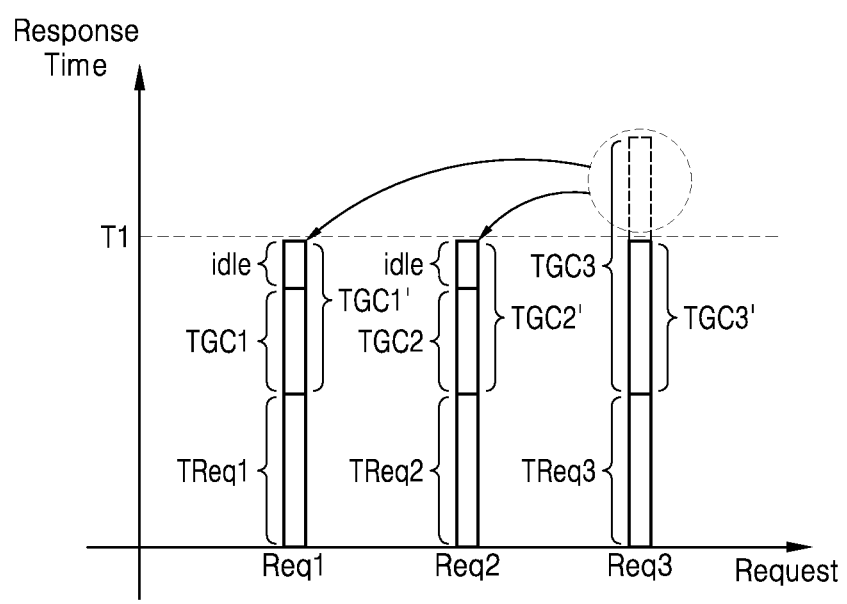
FIG. 5 is a response time diagram for successive operation requests in the system of FIG. 1 according to yet another embodiment of the inventive concept.

FIG. 5 is a response time diagram for successive operation requests in the system of FIG. 1 according to yet another embodiment of the inventive concept. The diagram of FIG. 5 is similar to the diagram of FIG. 3, except that the timing of certain operations has been rearranged so that the response time T1 is never exceeded. In particular, a portion of garbage collection that was performed in response to third operation request Req3 in FIG. 3 is now distributed among idle time following the operations performed in response to first and second operation requests Req1 and Req2. The rearrangement of these operations is reflected in FIG. 5 by differences between intervals TGC1 through TGC3 of FIG. 3, and corresponding intervals TGC1' through TGC3' of FIG. 5.

In the example of FIG. 5, QoS monitoring module 240 monitors whether the QoS satisfies a quality condition related to uniformity of response time. It can do so, for instance, by determining the amount of time required to perform the operations illustrated in FIG. 5. In response to a determination that the amount of time for some operations will exceed the maximum response time T1, operation metric management module 310 adjusts an operation metric (e.g., a start time for garbage collection) to produce the rearrangement of operations shown in FIG. 5.

Figure 6:
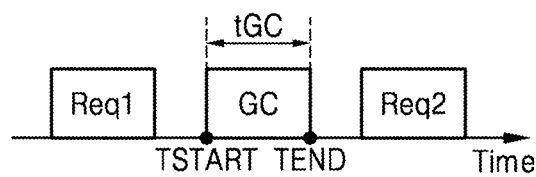
FIG. 6 is a timing diagram for successive operation requests and an intervening garbage collection operation in the system of FIG. 1 according to an embodiment of the inventive concept.

FIG. 6 is a timing diagram for successive operation requests and an intervening garbage collection operation in the system of FIG. 1 according to an embodiment of the inventive concept.

Referring to FIG. 6, before storage device 300 performs a garbage collection GC, storage device 300 transmits information on time to be consumed in performing the garbage collection at a time TSTART. The information on the time to be consumed may include, for instance, a start time TSTART where the garbage collection is to start, a time tGC to be consumed in performing the garbage collection, and/or an end time TEND where the garbage collection is to be completed. Such information may be transmitted to host 200 in the form of a notification signal. In some embodiments, the notification signal may also include information on a start time of an internal operation of storage device 300 in addition to the garbage collection, time needed to perform the internal operation, and/or a time when the internal operation is completed. Such an internal operation may be, for instance, wear-leveling, reclaiming, a data restoring, or bad block management.

Host 200 may perform other processes while performing the garbage collection in a section between after storage device 300 performs a first request Req1 and before storage device 300 performs a second request Req2. The other processes may include, for instance, a process requesting other storage devices (not shown) controlled by host 200 to perform the garbage collection, and in this case an operation synchronization between storage devices controlled by host 200 may be achieved.

Figure 7:
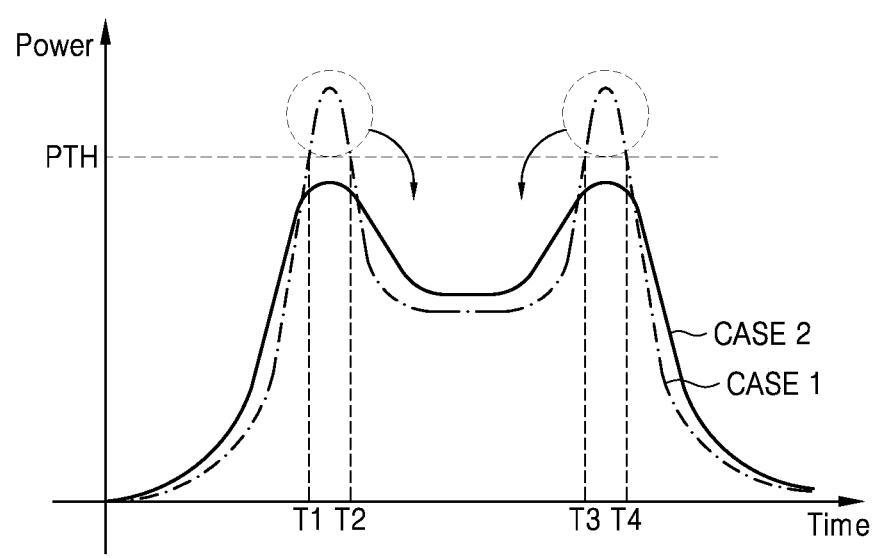
FIG. 7 is a power consumption diagram for the system of FIG. 1 according to an embodiment of the inventive concept.

FIG. 7 is a power consumption diagram for the system of FIG. 1 according to an embodiment of the inventive concept. In this example, a quality condition for QoS is a maximum power consumption level, or power threshold PTH.

Referring to FIG. 7, a power consumption of storage device 300 over time is illustrated. A dotted curve, labeled CASE1, indicates power consumption of storage device 300 under one set of operating conditions, and a solid curve, labeled CASE2, indicates power consumption of storage device 300 under another set of operating conditions.

In a first interval between a first time T1 and a second time T2 and a second interval between a third time T3 and a fourth time T4, power consumption of CASE1 exceeds a power threshold PTH. Accordingly, in the first and second intervals, the QoS does not satisfy the quality condition for the maximum power consumption. On the other hand, power consumption of CASE2 remains below power threshold PTH, so the QoS does satisfy the quality condition for the maximum power consumption.

One way to achieve the result of CASE2 is to adjust an operation metric to reduce power peak consumption. Such an operation metric may be, for instance, a number of requests to be processed simultaneously. The adjustment may be performed according to a result of monitoring performed by QoS monitoring module 240. As illustrated by CASE2 in FIG. 7, the adjustment may shift a portion of power consumed in the first and second intervals to an interval between second time T2 and third time T3.

Under some circumstances, where throughput needs to be increased in a specific time section, power threshold PTH or the number of requests to be processed at the same time may be increased. For example, during execution of an application requiring many requests to be processed concurrently, e.g., an application used in a graphic operation or a game, system 100 may increase power threshold PTH or the number of requests to be processed concurrently.

Figure 8:
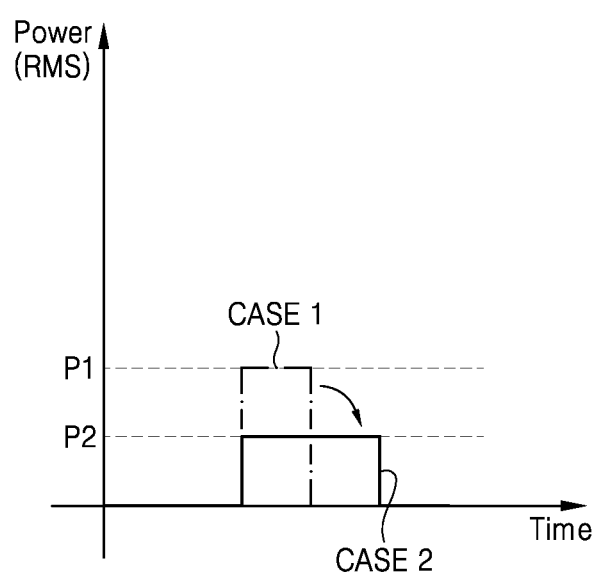
FIG. 8 is a power consumption diagram for the system of FIG. 1 according to another embodiment of the inventive concept.

FIG. 8 is a power consumption diagram for the system of FIG. 1 according to another embodiment of the inventive concept. In the example of FIG. 8, a quality condition of QoS of storage device 300 is a root mean square (RMS) power. The RMS power is presented as an example of an average power.

Referring to FIG. 8, power consumption of storage device 300 is illustrated over time. Under a first set of operating conditions, corresponding to a curve labeled CASE1, the RMS power of storage device 300 has a power level P1. Under a second set of operating conditions, corresponding to a curve labeled CASE2, the RMS power of storage device 300 has a power level P2. Notably, power level P2 is half of power level P1, and it is maintained for twice as long as power level P1. Accordingly, each of the curves in FIG. 8 corresponds to the same total power consumption.

According to a quality condition requested by a user, where a lower RMS power is requested (e.g., when a document operation having less throughput is performed, operation metric management module 310 may adjust an operation metric so that the RMS power has power level P2.

In some embodiments, the RMS power level may be increased where throughput needs to be increased in a specific time section. For example, during execution of an application requiring many requests to be processed concurrently in system 100, system 100 may increase the RMS power value.

Figure 9:
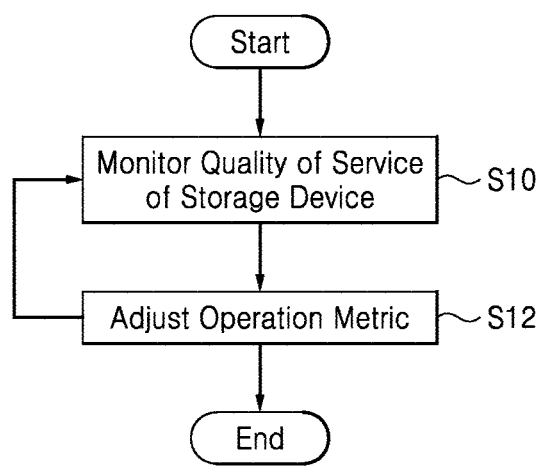
FIG. 9 is a flowchart illustrating a method of operating a system according to an embodiment of the inventive concept.

FIG. 9 is a flowchart illustrating a method of operating a system according to an embodiment of the inventive concept. For convenience, the method of FIG. 9 will be described with reference to systems 100 and 100' of FIGS. 1 and 2, respectively, although it is not limited thereto.

Referring to FIG. 9, QoS monitoring module 240 monitors a QoS of storage device 300 or 300' (S10).

In system 100 of FIG. 1, QoS monitoring module 240 in host 200 monitors the QoS (e.g., uniformity of response time, predictability of response time, or power consumption) of storage device 300. Processor 210 determines whether the monitored QoS satisfies a quality condition set through SLA management module 230, and it generates a request according to a result of determination. The request may be a request for adjusting an operation metric of storage device 300 or a request for requesting the operation metric in a current state.

In system 100' of FIG. 2, QoS monitoring module 240 in storage device 300' monitors the quality of service (e.g., uniformity of response time, predictability of response time, or a power consumption) of storage device 300'. Processor 210 generates a request requesting a result of the monitoring so as to check the monitored quality of service. For example, host 200' may periodically transmit the request to storage device 300' or transmit the request to storage device 300' where a user sets or changes a quality condition through SLA management module 230. Host 200' receives a result of the monitoring, and it generates a request for adjusting an operation metric according to a result of the monitoring or a request for maintaining the operation metric in a current state.

Operation metric management module 310 in storage device 300 or 300' adjusts the operation metric in response to a request transmitted from host 200 or 200' (S12). Storage device 300 or 300' may select and adjust at least one of multiple operation metrics related to a specific quality of service according to a priority order. Where more than one operation metric is selected, the selected operation metrics may be adjusted based on the priority order.

In some embodiments, host 200 or 200' or storage device 300 or 300' comprises an additional module for managing the priority order and selecting and/or adjusting operation metrics according to the priority order. The priority order may be set or changed by SLA management module 230 of host 200 or 200'. Host 200 or 200' or storage device 300 or 300' may further include an additional module for managing the priority order.

In some embodiments, operation metric management module 310 in storage device 300 or 300' transmits an operation metric in a current state to host 200 or 200' in response to a request transmitted from host 200 or 200'. In some other embodiments, storage device 300' transmits a notification signal to host 200' according to a result of the monitoring of QoS monitoring module 240. The notification signal may indicate a state of storage device 300'. For example, to increase predictability of response time of storage device 300', QoS monitoring module 240 may transmit a start time of the garbage collection and information on time needed to perform the garbage collection and/or information on a time when the garbage collection is completed. That is, the notification signal may include information on time needed to perform the garbage collection and/or information on a time when the garbage collection is completed.

Figure 10:
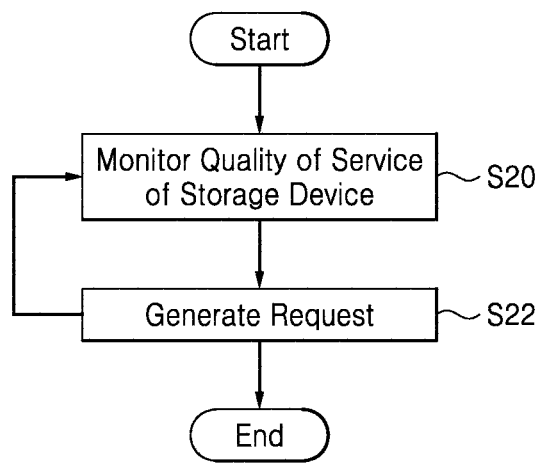
FIG. 10 is a flowchart illustrating a method of operating a host according to an embodiment of the inventive concept.

FIG. 10 is a flowchart illustrating a method of operating a host according to an embodiment of the inventive concept. For convenience, the method of FIG. 10 will be described with reference to system 100 of FIG. 1, although it is not limited thereto.

Referring to FIG. 10, host 200 monitors the QoS of storage device 300 (S20). Host 200 determines whether the monitored QoS satisfies a quality condition set through SLA management module 230, and generates a request according to a result of determination (S22). Operations S20 and S22 are repeated to continually monitor and control QoS of storage device 300.

Figure 11:
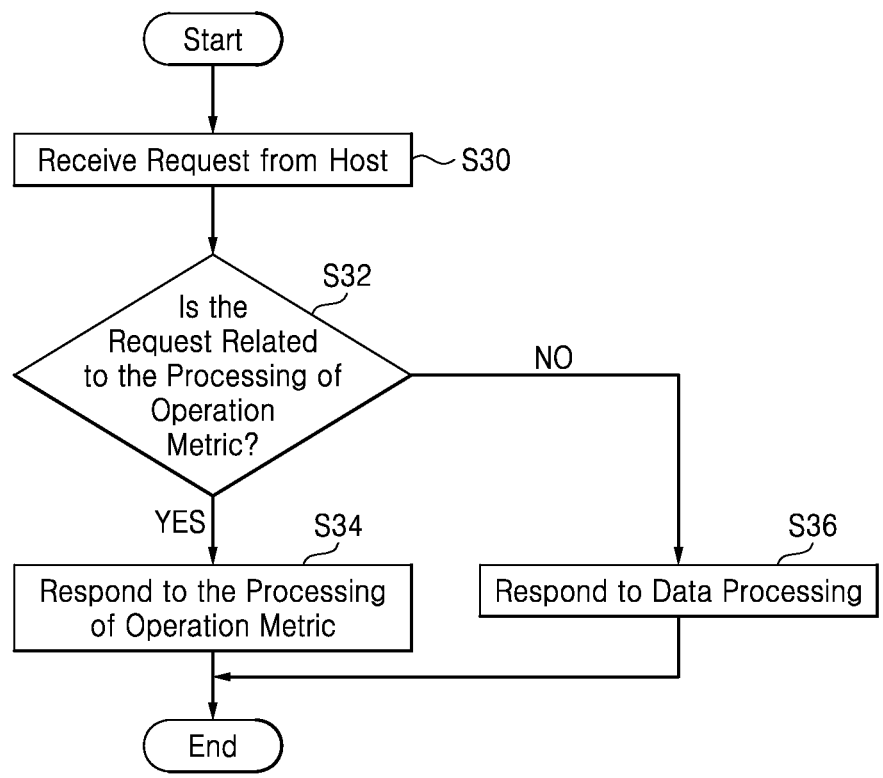
FIG. 11 is a flowchart illustrating a method of operating a storage device according to an embodiment of the inventive concept.

FIG. 11 is a flowchart illustrating a method of operating a storage device according to an embodiment of the inventive concept. For convenience, the method of FIG. 11 will be explained with reference to system 100' of FIG. 2, although it is not limited thereto.

Referring to FIG. 11, storage device 300' receives a request transmitted from host 200' (S30). Storage device 300' determines whether the received request is related to a processing of an operation metric (S32). The request may include, for instance, an identifier indicating whether the request is related to the processing of the operation metric. In this case, storage device 300' may determine whether the received request is related to the processing of the operation metric using the identifier. Where the request is related to the processing of the operation metric, storage device 300' responds to the processing of the operation metric in response to the request (S34).

Storage device 300' may adjust the operation metric and transmits the adjusted operation metric value to host 200'. Alternatively, storage device 300' may transmit the operation metric value in a current state to host 200' in response to a request transmitted from host 200'. Still alternatively, storage device 300' may transmit a result of the monitoring for the QoS of storage device 300' to host 200' in response to a request transmitted from host 200'.

Storage device 300', where the received request is not related to the processing of the operation metric, may respond to a data processing in response to the request (S36). In some embodiments, storage device 300' programs, reads, or erases data stored in storage device 300' in response to a request transmitted from host 200'.

FIGS. 12-15 are block diagrams of systems according to still other embodiments of the inventive concept. The systems of FIGS. 12-15 are variations of system 100 of FIG. 1.

Figure 12:
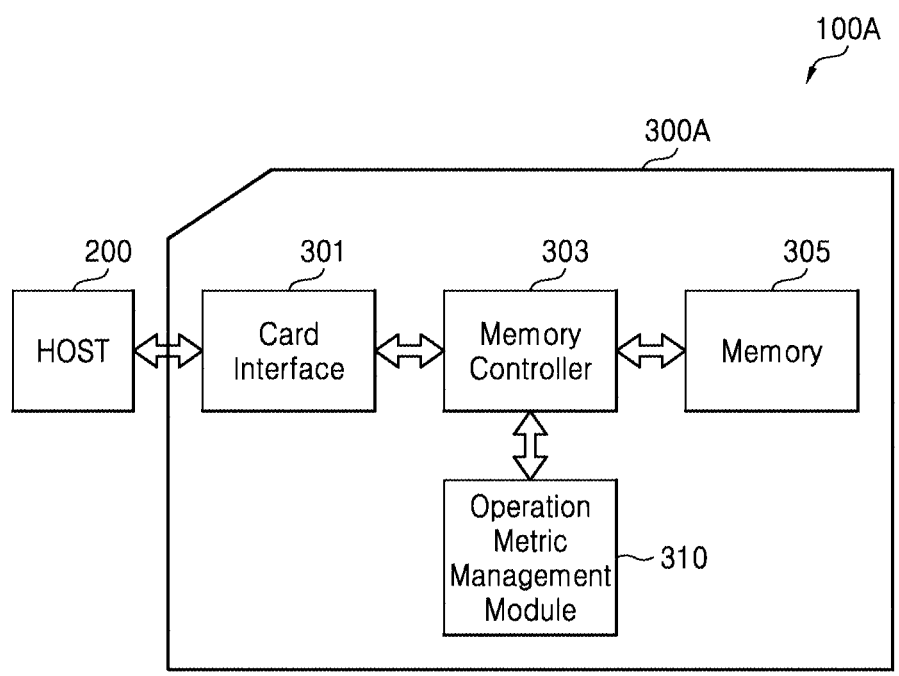
FIG. 12 is a block diagram of a system according to another embodiment of the inventive concept.

Referring to FIG. 12, a system 100A comprises host 200 and a storage device 300A. Host 200 may be, for instance, a personal computer (PC), a data server, a network-attached storage (NAS), or a portable electronic device. Storage device 300A is a memory card implementation of storage device 300 shown in FIG. 1.

Storage device 300A comprises a card interface 301 that facilitates communication with host 200, a memory 305, and a memory controller 303 that controls data communication between card interface 301, and memory 305. Operation of operation metric management module 310 of FIG. 12 is substantially the same as an operation of the operation metric management module of FIG. 1.

Figure 13:
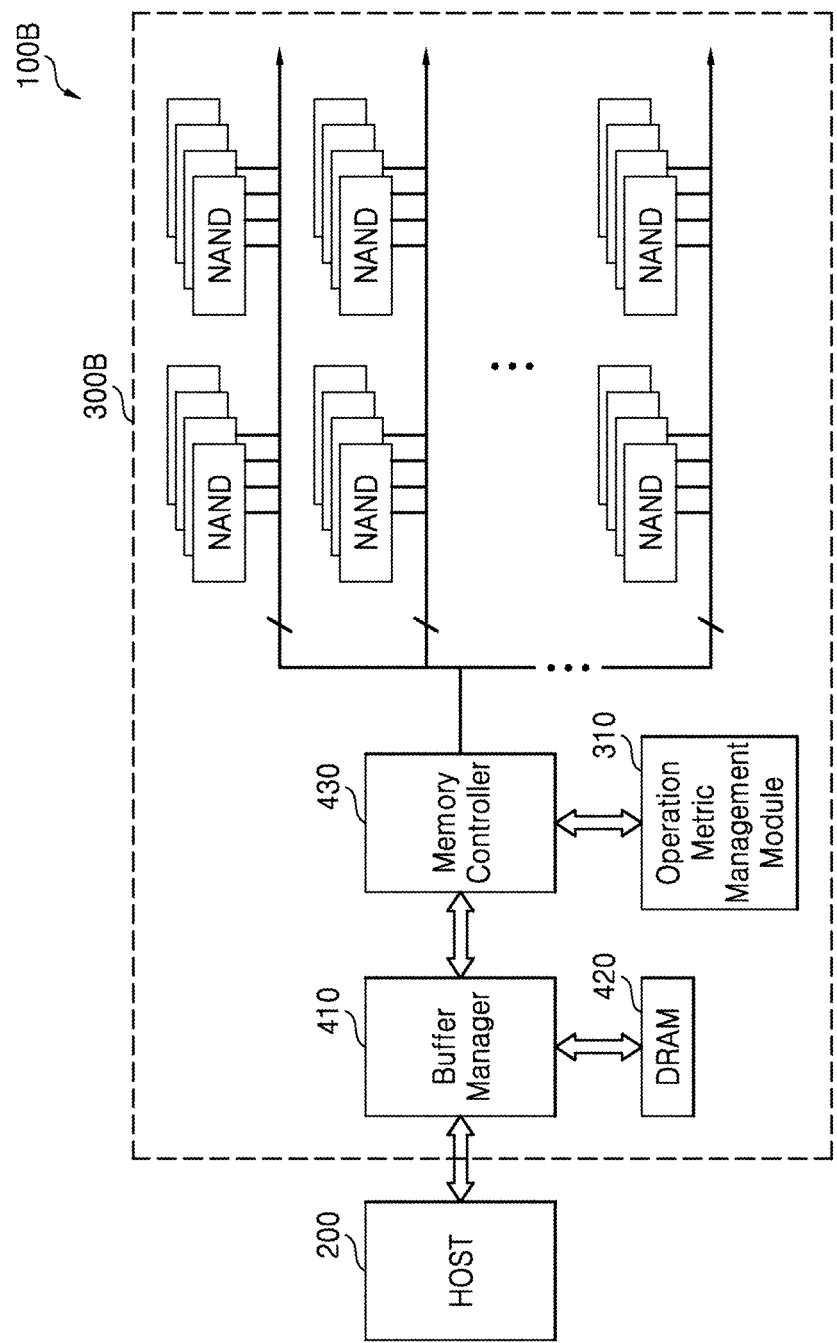
FIG. 13 is a block diagram of a system according to still another embodiment of the inventive concept.

Referring to FIG. 13, a system 100B comprises host 200 and a storage device 300B. Storage device 300B comprises a buffer manager 410, a DRAM 420, a memory controller 430, an operation metric management module 310, and multiple flash-based storage devices, e.g., NAND flash memory devices. In some an embodiments, storage device 300B takes the form of an SSD.

Buffer manager 410 controls storage of data transmitted or received between host 200 and memory controller 430 in DRAM 420. Memory controller 430 controls data processing operations, e.g., program operations, read operations, and erase operations, of each of the flash-based storage devices NAND.

Figure 14:
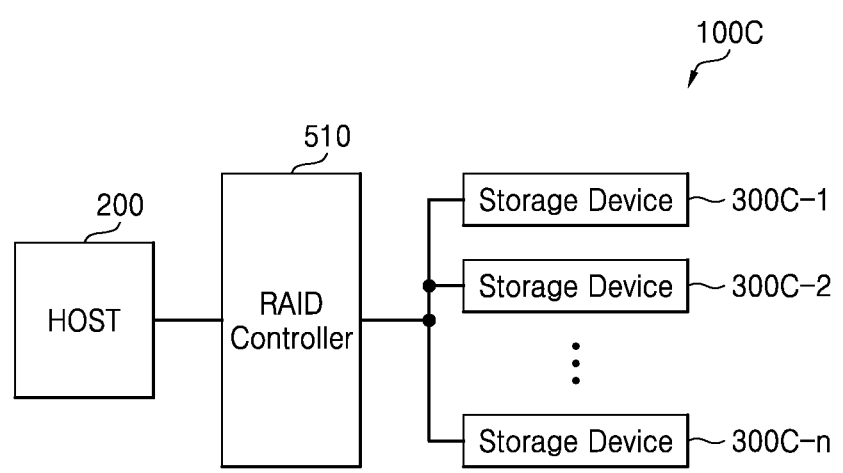
FIG. 14 is a block diagram of a system according to still another embodiment of the inventive concept.

Referring to FIG. 14, a system 100C forms a RAID. System 100C comprises host 200, a RAID controller 510, and multiple storage devices 300C-1 to 300C-n, where n is a natural number. Each of storage devices 300C-1 to 300C-n may be storage device 300 illustrated in FIG. 1 or storage device 300' illustrated in FIG. 2. Storage devices 300C-1 to 300C-n may form a RAID array.

During a program operation, RAID controller 510 outputs program data from host 200 to at least one of storage devices 300C-1 to 300C-n based on the RAID level. During a read operation, RAID controller 510 transmits data output from at least one of the memory-based storage devices 300C-1 to 300C-n to host 200 based on the RAID level.

Figure 15:
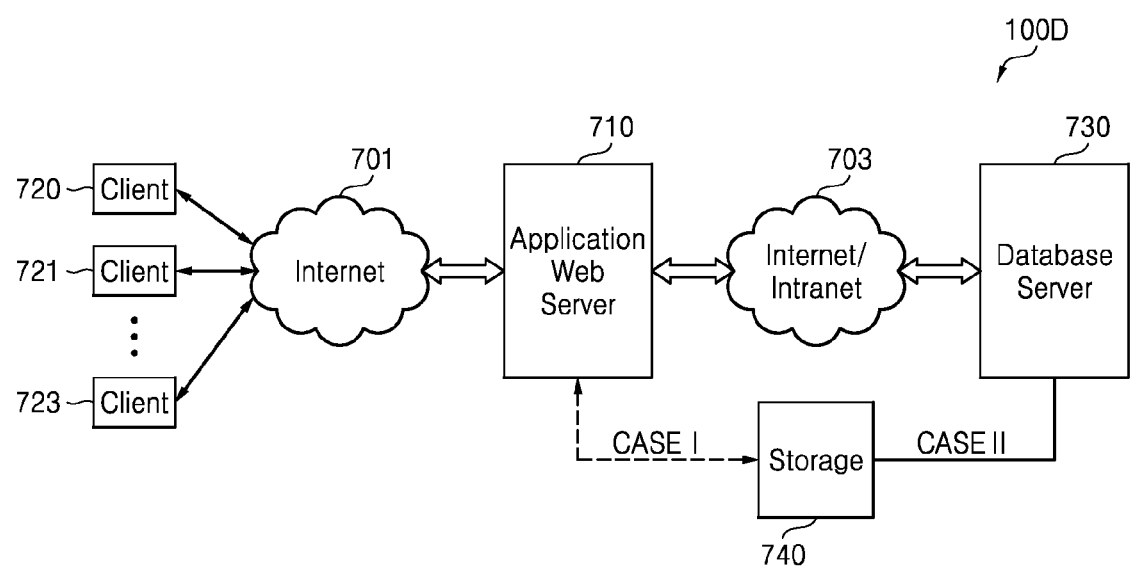
FIG. 15 is a block diagram of a system according to still another embodiment of the inventive concept.

Referring to FIG. 15 a system 100D comprises an application web server 710, clients 720 to 723, and storage device 740. Application web server 710 and clients 720 to 723 form a communication network through an internet 701. Application web server 710 performs a function of host 200 or 200', and storage device 740 performs a function of storage device 300 or 300'. Application web server 710, according to a first case CASE1, transmits data to a buffering region (not shown) of storage device 740, and storage device 740 writes data stored in the buffering region (not shown) in a storage media (not shown) of storage device 740.

According to a second case CASEII, system 100D further comprises a database server 730. In this case, application web server 710 and a data base server 730 may be connected to each other through an internet or an intranet 703. Database server 730 performs a function of host 200 or 200', and storage device 740 performs a function of storage device 300 or 300'. Accordingly, database server 730 may transmit data to the buffering region (not shown) of storage device 740 (not shown), and storage device 740 may write data stored in the buffering region (not shown) in the storage media (not shown) of storage device 740. In this case, database server 730 monitors whether the quality of service of the storage device 740 satisfies a quality condition set through database server 730, and adjusts operation metrics related to a quality of service of storage device 740 according to a result of the monitoring.

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. A method executed by a storage device, the method comprising:
monitoring whether a quality of service (QoS) of the storage device satisfies a quality condition set through a host and received from the host;
adjusting a current setting of at least one operation metric of the storage device related to the QoS, according to a result of the monitoring;
receiving a request from the host;
determining whether the received request is related to a processing of the operation metric or a data processing, using an identifier included the request; and
transmitting one of an adjusted operation metric value, an operation metric value of the current setting, and the result of the monitoring to the host in response to the request according to the determination results.

2. The method of claim 1, further comprising:
repeating the monitoring and adjusting until the QoS of the storage device satisfies the quality condition set through the host.

3. The method of claim 1, wherein adjusting the current setting of the at least one operation metric comprises adjusting a current setting of each of multiple operation metrics according to a priority order set through the host.

4. The method of claim 3, wherein the priority order is set by the host either automatically or in response to a user input.

5. The method of claim 1, wherein the operation metric corresponds to at least one of a measure of throughput of the storage device, a measure of storage capacity of the storage device, a measure of data persistence of the storage device, a measure of data reliability of the storage device, a measure of latency of the storage device, a measure of uniformity of response time of the storage device, and a measure of power consumption of the storage device.

6. The method of claim 5, wherein the current setting of the operation metric indicates a maximum number of requests to be processed by the storage device in a predetermined time, and adjusting the current setting of the operation metric comprises increasing or decreasing the maximum number.

7. The method of claim 5, wherein the current setting of the operation metric indicates an amount of free space in the storage device designated for data storage, and adjusting the current setting of the operation metric comprises increasing or decreasing the designated amount of free space.

8. The method of claim 5, wherein the measure of data persistence corresponds to a cache size of the storage device, and adjusting the current setting of the operation metric comprises increasing or decreasing the cache size.

9. The method of claim 5, wherein the current setting of the operation metric determines whether a designated region of the storage device is operating in a single level cell (SLC) mode or a multi-level cell (MLC) mode.

10. The method of claim 9, further comprising adjusting the current setting of the operation metric such that the storage device operates in the SLC mode for execution of a process requiring relatively high reliability operation of the storage device, and such that the storage device operates in the MLC mode otherwise.

11. The method of claim 5, wherein the current setting of the operation metric defines a condition for moving data between a region of the storage device operating in a single level cell (SLC) mode and a region of the storage device operating in a multi-level cell (MLC) mode, wherein the condition comprises at least one of a migration condition, a condition for performing wear leveling, and a condition for performing memory reclamation.

12. The method of claim 5, wherein the current setting of the operation metric defines a maximum response time for operations performed by the storage device in response to requests from the host, and the method comprises adjusting the current setting of the operation metric to increase the maximum response time upon determining that the storage device has exceeded the maximum response time.

13. The method of claim 5, further comprising adjusting the current setting of the operation metric by increasing or decreasing average power of the storage device by a designated amount.

14. The method of claim 13, wherein increasing or decreasing average power comprises respectively increasing or decreasing a number of memory access requests to be processed concurrently by the storage device.

15. The method of claim 1, further comprising adjusting the current setting of the operation metric to advance a start time of garbage collection in the storage device as a consequence of determining that the storage device has exceeded a maximum response time.

16. The method of claim 15, wherein advancing the start time of garbage collection comprises performing a scheduled garbage collection operation during an idle time between completion of an operation of the storage device and a maximum response time for the operation.

17. The method of claim 1, wherein the storage device transmits a notification signal to the host to indicate the timing of at least one internal operation of the storage device, and the host performs a process during the at least one internal operation as a consequence of receiving the notification signal, wherein the at least one internal operation comprises at least one of wear-leveling, memory reclamation, data restoration, and bad block management.

18. The method of claim 1, further comprising:
changing the quality condition in response to a user input;
monitoring the QoS according to the changed quality condition; and
adjusting the current setting of the operation metric according to the monitoring performed according to the changed quality condition.

19. The method of claim 1, wherein the host performs the monitoring based on information received from the storage device, and adjusts the current setting by communication with the storage device.

20. A storage device, comprising:
at least one memory device configured to perform memory access operations in accordance with at least one operation metric of the storage device having an adjustable setting; and
an operation metric management module configured to monitor whether a quality of service (QoS) of the storage device satisfies a quality condition set by and received from a host, adjust a current setting of the at least one operation metric according to whether the QoS of the storage device satisfies the quality condition, and transmit one of an adjusted operation metric value, an operation metric value of the current setting, and a result of the monitoring to the host in response to a request received from the host, wherein
the operation metric management module determines whether the received request is related to a processing of the operation metric or a data processing, using an identifier included the request.

* * * * *